United States Patent [19]

Dragoset, Jr.

[11] Patent Number: 4,809,235
[45] Date of Patent: Feb. 28, 1989

[54] METHOD FOR REMOVING DOPPLER PHASE DISPERSION FROM SEISMIC DATA

[75] Inventor: William H. Dragoset, Jr., Houston, Tex.

[73] Assignee: Western Atlas International, Inc., Houston, Tex.

[21] Appl. No.: 101,386

[22] Filed: Sep. 28, 1987

[51] Int. Cl.$^4$ ............................................. G01V 1/38
[52] U.S. Cl. ...................................... 367/21; 367/904; 367/20
[58] Field of Search .................. 367/904, 20, 21, 101, 367/53

[56] References Cited

U.S. PATENT DOCUMENTS 3,593,256 7/1971 Gannon ............................... 367/904

OTHER PUBLICATIONS

Van Valkenburg et al., Network Analysis, 1974, pp. 222-233.

Primary Examiner—Thomas H. Tarcza
Assistant Examiner—Daniel T. Pihulic
Attorney, Agent, or Firm—E. Eugene Thigpen

[57] ABSTRACT

The invention is a method of reducing phase distortion in a detected seismic signal resulting from Doppler shifting of the transmitted signal. An operator is convolved with the seismic data to correct the dispersion. The operator is determined for the particular transmitted signal and boat speed. The operator is normally determined in the frequency-wave number domain. The seismic data may be transformed to the frequency-wave number domain for performing the convolution. The transformed data may then be transformed back to the time-space domain. Alternatively, the determined operator may be transformed to the time-space domain and the convolution performed in that domain.

12 Claims, 12 Drawing Sheets

FIG. 10 Before phase correction

FIG. 11 After phase correction

FIG. 14 Air gun data

METHOD FOR REMOVING DOPPLER PHASE DISPERSION FROM SEISMIC DATA

BACKGROUND OF THE INVENTION

The invention relates to the field of marine seismic exploration. In the past, marine seismic exploration has been performed for the most part with the use of impulsive sources. For a number of reasons, however, interest in marine vibrators has increased. Unlike an impulsive source, a vibrator can be adjusted easily so that, spectrally, its output energy is tailored to the requirements of a specific exploration objective. Because of the correlation step in processing, vibrator data are less sensitive than are data acquired with impulsive sources to many kinds of noise bursts, including shots from other crews, sounds from shipping lanes and drilling rigs, and activities of marine animals. Two vibrating sources can be run simultaneously with orthogonal sweep functions and data from two adjacent seismic lines acquired simultaneously with a single receiver cable, without having to compromise shotpoint spacing by alternately firing two sources. Since the output of a vibrator is spread over a relatively long time interval, the peak output level of the source is much lower than that of an impulsive source having comparable strength, which reduces possible impact on the environment.

In the normal mode of marine operations, the seismic ship, the source, and the receivers move continuously through the water as data are recorded. Because of that motion, the possibility exists of Doppler shifting of the vibratory signals emitted by the source and detected by the receivers. Methods for correcting the effect of Doppler shifting of the seismic data, however, have not heretofore been known.

SUMMARY OF THE INVENTION

The invention is a method of reducing phase distortion in a detected seismic signal resulting from Doppler shifting of the transmitted signal. An operator is convolved with the seismic data to correct the dispersion. The operator is determined for the particular transmitted signal and boat speed. The operator is normally determined in the frequency-wave number domain. The seismic data may be transformed to the frequency-wave number domain for performing the convolution. The transformed data may then be transformed back to the time-space domain. Alternatively, the determined operator may be transformed to the time-space domain and the convolution performed in that domain.

DETAILED DESCRIPTION OF THE PREFERRED EMBODIMENT

Figure 1:
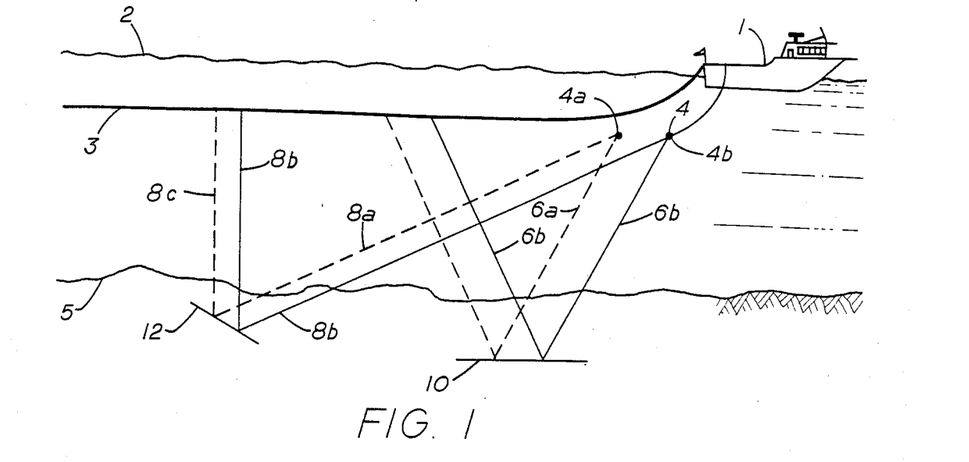
FIG. 1 shows ray paths of seismic signals in the subsurface.

The term "Doppler shift" is the term normally used to designate the difference in frequency between a received and transmitted signal resulting from movement of the transmitter and/or the receiver during the signal transmission or reception. When utilizing a vibratory source as a marine seismic source, Doppler shifting will occur if either the source or detectors are moving during transmission of the seismic signal. Moreover, dipping subsurface reflecting interfaces will create a Doppler shift even though the seismic source and receiver are both towed by the same boat and have zero velocity with respect to each other. This phenomena is illustrated in FIG. 1. Most marine seismic exploration is performed by towing the source and detectors behind a boat at a constant velocity and the invention will be described herein primarily as it applies to such operations.

As used herein, the term vibrator or vibratory source is intended to refer to sources which emit seismic signals having a selected frequency content over a period of time which will normally be several seconds. These signals may be sinusoidal, or they may be substantially square-wave signals, or they may comprise other form of shaped-pulse signals. The seismic signals emitted by these sources are commonly referred to as sweeps, since the fundamental frequency of the signal will normally begin at a selected frequency and "sweep" from that beginning frequency to a different ending frequency. The change in frequency with time may be linear or nonlinear. In some situations, it may be desirable to transmit a single frequency sinusoidal, square-wave, or shaped-pulse signals, which are intended to be included within the term "swept-frequency" as used herein.

FIG. 1 represents a marine seismic cable 3 and a marine seismic source 4 being pulled through a body of water 2 by a seismic vessel. FIG. 1 represents the source generating a signal as the source is towed from a first position 4a to a second position 4b. From position 4a, the emitted seismic signal is shown travelling along ray paths 6a and 8a to subsurface reflecting interfaces 10 and 12 respectively. From position 4b the signal will travel along ray paths 6b and 8b. It can be seen that, for a reflection from an interface lying parallel to the earth's surface, the length of the path travelled by the seismic signal along paths 6a and 6b will be the same, hence, there will be no Doppler effect. However, because of the dip of the reflecting interface 12, ray path 8b is longer than ray path 8a, with the result that the frequency of the signal detected by the receiver on the cable as the source moves from position 4a to 4b will be lower than the frequency of the signal transmitted by the source. A dip of the reflecting interface in the opposite direction would, of course, result in an increased detected frequency.

The transmitted frequency, $f_s$, of a Doppler shifted signal is related to the received frequency, $f_r$, by the relation ti $f_r = f_s(1+\delta)$   Eq.1 where $\delta$ is the Doppler factor.

It has been determined that the maximum Doppler factor for a marine seismic signal emitted by a source and detected by a detector which are both being towed through the water by a boat is equal to $2V_b/V_p$, where $V_b$ is the boat speed and $V_p$ is the speed of sound in water.

If only the source or the detector is moving, the maximum Doppler factor is $V_b/V_p$, in which $V_b$ represents the speed of the source or detector, whichever is moving.

During data recording, seismic ships typically maintain a speed of about 5 knots (2.57 meters/second). Since $V_p$ is about 1500 meters/second, the largest Doppler factor that is likely to be encountered in recording marine data is about 0.0034. If a marine seismic vibrator generates a signal which sweeps from 10 Hz to 60 Hz, then frequency shifts of between 0.034 Hz and 0.204 Hz between the transmitted and received signals could be observed at the frequency extremes of the sweep.

Figure 2A:
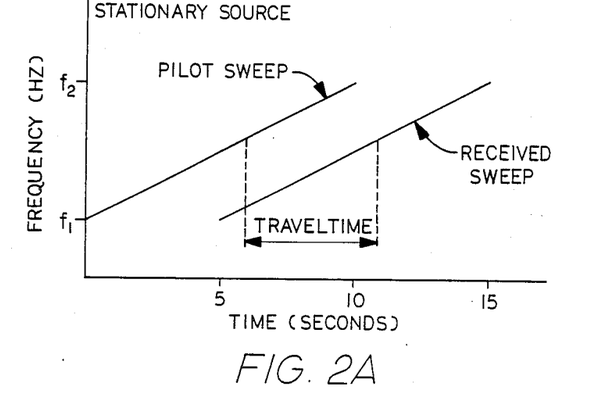
FIGS. 2a, 2b and 2c are representations of Doppler shifting of a swept-frequency signal.
Figure 2B:
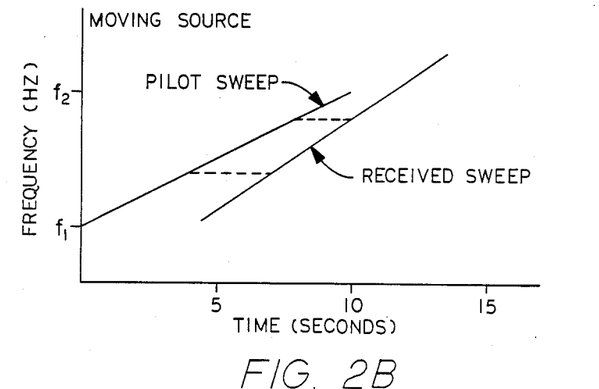
Figure 2C:
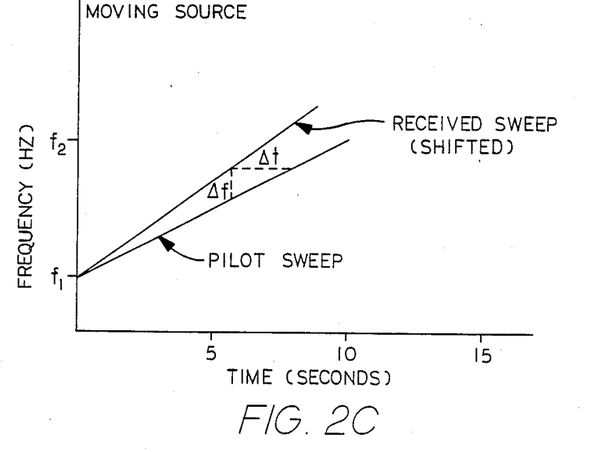

FIGS. 2a, 2b and 2c illustrate the effect of the Doppler frequency shift on seismic data. FIG. 2a shows a transmitted, or pilot, seismic signal which sweeps from a first frequency, $f_1$, to a second frequency, $f_2$, over a period of 10 seconds. In FIG. 2a, the distance traveled between the source and receiver remains constant, and the received signal will have the same form as the transmitted signal. The reception will be delayed by the travel time from source to receiver, but this delay time will be constant over the period of the sweep.

FIG. 2b shows the same pilot sweep and a representation of the alteration of the received signal resulting from a progressive shortening of transmission path length during the time period over which the signal is transmitted and received. Because of the shortening of the transmission path, the transmission time between the source and receiver, as well as the frequency of the received signal, will be shifted. FIG. 2c shows a comparison between the received and transmitted signals of FIG. 2b. A shown, the frequency of the received signal increases with time at a faster rate than the transmitted signal. It is understood that if the transmitted signal ray path were increasing rather than decreasing, the frequency of the received signal would increase at a slower rate than the transmitted signal. As shown, the phase distortion resulting from the Doppler shift can be represented by the relation $\phi(f) = 360° f \Delta t$   Eq.2 where $\phi(f)$ = phase distortion, which is the shift in phase between the occurrence of a given frequency in the transmitted and received signals after the received signal has been shifted in time so that the beginning of signal reception is aligned in time with the beginning of a signal transmission.
f = frequency
$\Delta t$ = difference in time between the occurrence of a given frequency in the transmitted and received signals.

The slope of the pilot sweep line is equal to $\Delta f/\Delta t$, which is also equal to $(f_2-f_1)/T$, where T is the time duration of the sweep. Therefore, $\phi(f)$ may also be represented by:

$\phi(f) = 360° f \Delta f T/(f_2 - f_1)$, and since $\Delta f = \delta f$   Eq. 3

$\phi(f) = 360° f^2 \delta T/(f_2 - f_1)$

For a pilot signal which sweeps from 10 to 60 Hz and a Doppler factor of 0.0034, the phase shift at 60 Hz calculated from Equation 3 is 880°. Even one-tenth this much phase shift would visibly alter the character of reflection events.

In order to analytically determine the effect of the Doppler factor on seismic data a model was generated in which a dipping bed is treated as a sequence of closely-spaced point diffractors. The response of each point diffractor was computed by simulating the "towing" of a source and receiver across each point diffractor with the offset between the source and receiver being kept constant. Correlating the simulated received signals with the pilot sweep produces a gather which models the response of the point diffractor at a particular source-receiver offset. Summing the responses of all the individual point diffractors in a segment produces the constant-offset response of the dipping segment.

Although simulating a recorded sweep for a point diffractor when the source and/or the receiver are in motion is more complicated than it would be for a stationary source and receiver, such a recorded sweep may be simulated utilizing the geometry of the transmission path and the assumed boat speed. The time when each segment of the transmitted signal reaches the receiver is calculated to construct the form of the received signal.

Figure 3:
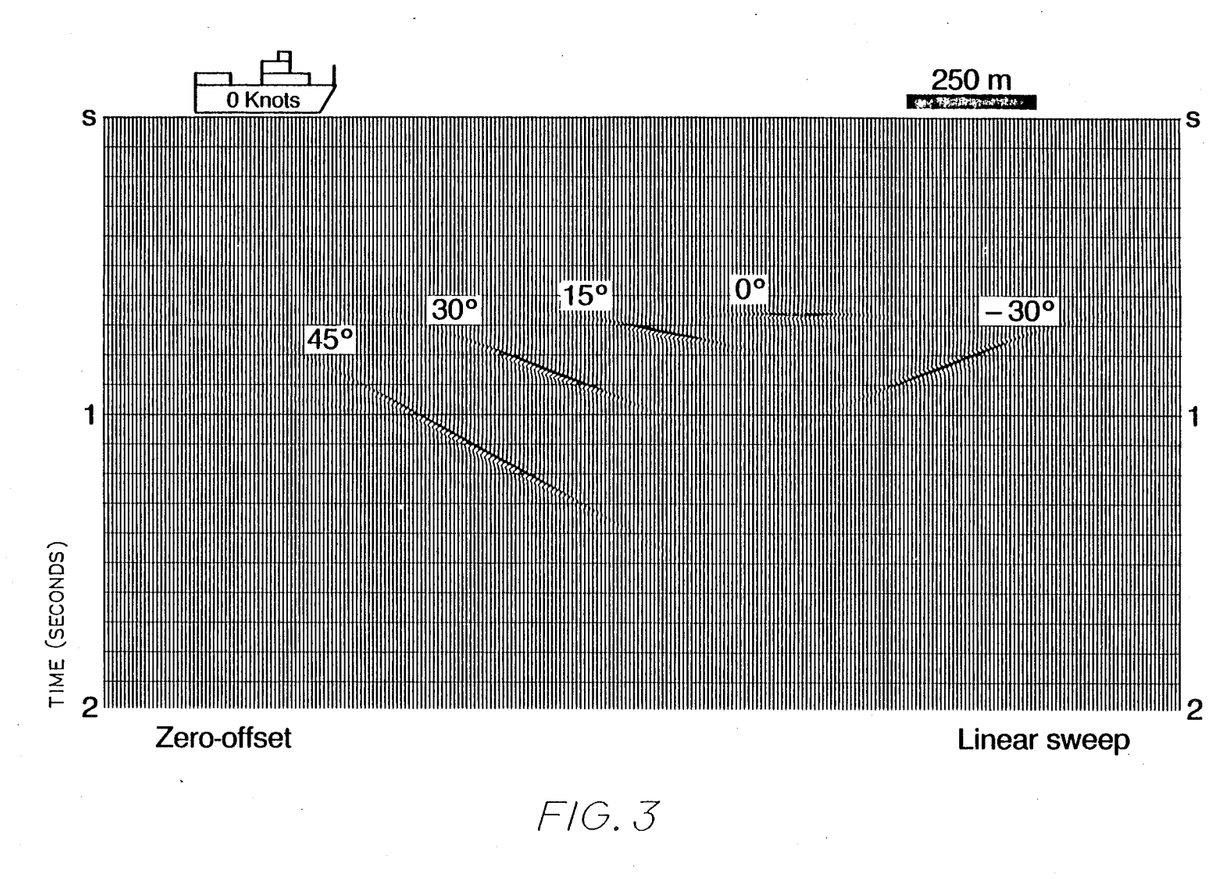
FIG. 3 is a model of seismic data where the source and receiver are stationary.
Figure 4:
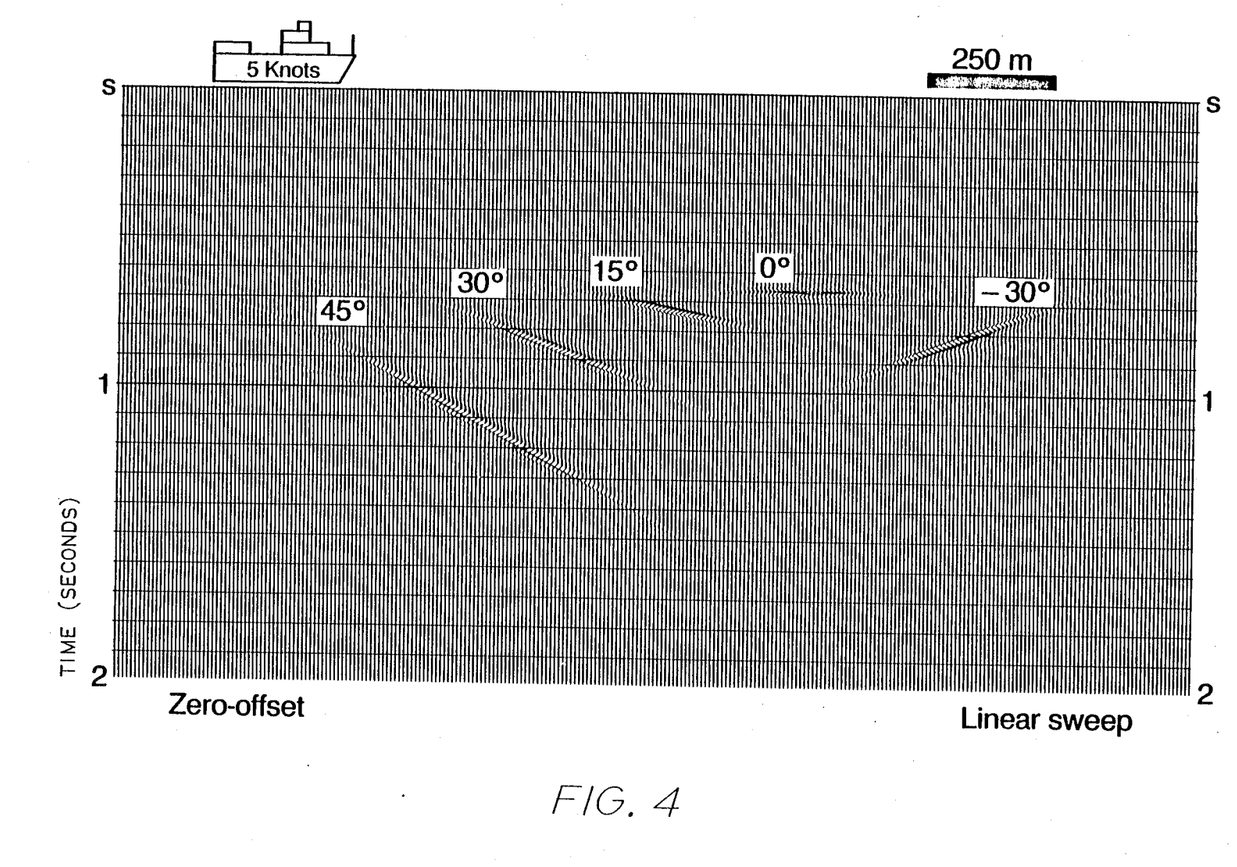
FIG. 4 is a model of seismic data where the source and receiver are moving at a constant velocity.

FIGS. 3 and 4 show the simulated results for reflecting segments of a number of different dips. FIG. 3 is modeled with zero source and receiver velocity and zero offset between the source and receiver. FIG. 4 is modeled with zero-offset between source and receiver but with the source and receiver being towed through the water at a speed of 5 knots (2.57 meters/second). The data for FIGS. 3 and 4 were generated by calculating the received signal waveform and correlating this received waveform with the transmitted waveform. In FIGS. 3 and 4, the top of each segment in the model is at a depth of 500 meters, with the velocity of the seismic signal assumed to be 1500 meters/second. Each segment spans a horizontal distance of 200 meters.

The phase dispersion caused by the Doppler effect can be seen by comparing the wavelets in FIG. 4 to those in FIG. 3. For 0° dip there is no dispersion. As is clearly visible from FIG. 4 as the dip angle increases the dispersion increases accordingly.

Figure 5:
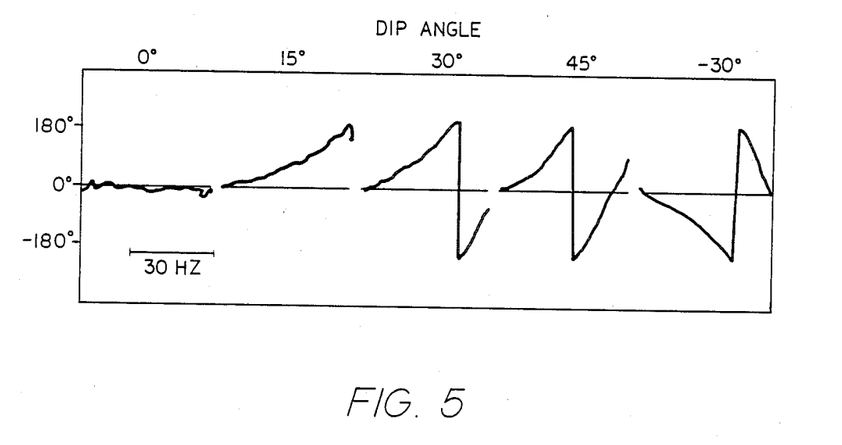
FIG. 5 shows phase angle dispersion.

FIG. 5 shows the phase dispersion more quantitatively. FIG. 5 shows a plot of phase as a function of frequency and dip angle of the reflecting interface. FIG. 5 was generated by selecting particular traces from FIG. 3, finding the phase only inverses of the wavelets in those traces, convolving the inverses with the corresponding Doppler-shifted traces from FIG. 4, and then transforming the results into the frequency domain. FIG. 5 is in agreement with Equation 3, showing an increase in phase dispersion with frequency and dip angle.

It has been determined that the distorted signal waveform reflected by a dipping bed and received by a moving receiver and transmitted by a seismic source moving at the same velocity is related to the undistorted signal received by and transmitted from a stationary receiver and transmitter as $$t_s(V_b \neq 0) = t_s(V_b = 0)[1 + \delta] \quad \text{Eq. 4}$$

where $t_s$ represents distorted time. That is, the distorted waveform is simulated by taking the undistorted waveform and replacing t by $t(1+\delta)$. Therefore, the distortion effect can be viewed either as a distortion of time or alternatively as a shifting of frequency.

An operator to correct the Doppler effect was developed according to the following procedure:
1. Develop a time-distorted version of the pilot sweep according to Eq. 4;
2. correlate the distorted sweep with the undistorted pilot sweep; and
3. generate the phase only inverse of the cross-correlated wavelet.

The phase only inverse is the desired operator. The phase dispersion is removed from the seismic data by convolving this operator with the data.

This correction method requires knowledge of the Doppler factor. In order for the method to be applied to a set of data, the Doppler factor must be determinable for every reflection event in the data set.

It has been determined analytically that the Doppler factor depends only on the direction of the transmitted and received signal in the water layer, but is independent of any variations in those directions which may occur in the subsurface, and that the Doppler factor is a function only of the boat speed and the time dip of the seismic signal, that is:

$$\delta = -V_b \frac{\Delta t}{\Delta y} \quad \text{Eq. 5}$$

in which $\frac{\Delta t}{\Delta y}$ is the time dip in which $\Delta t / \Delta y$ is the time dip.

From Equations 3 and 5, it follows that the Doppler effect is a function only of frequency and dip.

Because the Doppler effect is only a function of frequency and dip, an operator to correct the phase dispersion may be conveniently generated in the k-ω (wave number-frequency) domain. In the time-space domain, a constant offset section is a hodgepodge of events. In the k-ω, or frequency domain, however, each area of a seismic data section corresponds to a unique frequency and dip. Phase dispersion may, therefore, be corrected by:
1. Computing the phase correcting operator in the k-ω (wave number- frequency) domain;
2. transforming the constant-offset seismic section to the k-ω domain;
3. applying the phase correcting operator; and
4. transforming the corrected data back to the time-space domain.

The operator that will correct a particular set of seismic data for the Doppler shift may be derived by the following procedure implemented on a digital computer. Computer programs to implement the steps specified herein may be drafted by those of ordinary skill in the art, and will not be included herein.

Let $F(k,\omega)$ represent the desired operator in the k,ω domain.

1. Initialize F as an all pass filter, where $F(k,\omega) = 1 + 0j$, for all k and ω, in which $j = \sqrt{-1}$
2. Start of dip loop $$\text{dip}_i = (i-1) \frac{\text{dip}_{max}}{N}, \text{ for } i = 1 \text{ to } N \quad \text{Eq. 6}$$

where
N = the number of dips to be calculated (typically 25-35)
$\text{dip}_{max}$ = steepest dip in the seismic data, in seconds/trace.

3. Compute the Doppler factor for a first selected dip (the ith dip)

$$\delta_i = \frac{(-V_b)\text{dip}_i}{\Delta y} \quad \text{Eq. 7}$$

in which,
$\Delta y$ = spacing between traces (meters/trace)
$V_b$ = boat speed (meters/second)
Note: The sign is determined by the definition of time dip. Time dip is assumed to be positive if an event dips downward in the direction of boat motion.

4. Let v(t) represent the pilot sweep, then calculate the distorted sweep, $v_s(t)$ for the first selected dip by replacing t with $t(1+6\delta_i)$:

$$v_s(t) = v(t(1+\delta_i)) \quad \text{Eq. 8}$$

5. Correlate the pilot sweep with the distorted pilot sweep for the first selected dip, to generate the correlated wavelet designated as W(t):

$$W(t) = v_s(t) \circledast v(t) \quad \text{Eq. 9}$$

6. Convert the correlated wavelet to the frequency domain:

$$W(\omega) = \int_{-\infty}^{\infty} W(t) e^{-j\omega t} dt \quad \text{Eq. 10}$$

7. Compute the complex conjugate $W^*(\omega)$ for $W(\omega)$,
8. For the selected dip calculate the values of k as a function of ω.

$$k = 1 + 2(\text{dip}_i)(\omega) \frac{(k_{max})}{2\pi} \quad \text{Eq. 11}$$

Figure 6:
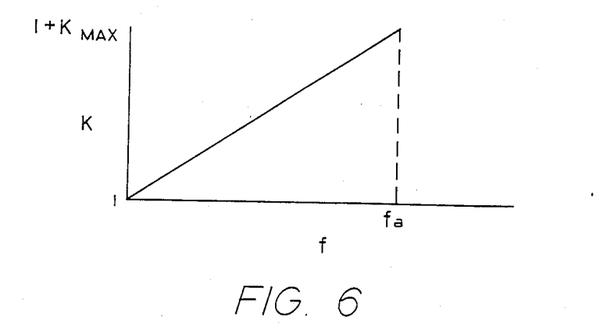
FIG. 6 shows a line in the k-ω plane representing all reflecting beds having a particular dip.

See FIG. 6. A dipping feature will fall along a radial line in the wave number-frequency domain. From FIG. 6, an equation for the radial line may be written as:

$$k = 1 + \frac{f}{f_a} k_{max} \quad \text{Eq. 12}$$

The term $f_a$ is generally known as the "spatial-alias frequency". The term is well known to those of ordinary skill in the art and has been derived in many text books. See, for example, Imaging the Earth's Interior, J. F. Clerbout, page 259.

$$f_a = \frac{\text{horizontal phase velocity (meters/second)}}{2(\text{trace interval}) (\text{meters/trace})}$$

$f_a = 1/(2\text{dip}_i)$, where $\text{dip}_i$ is in seconds/trace
and since $f = \omega 2\pi$, Equation 11 is derived from Equation 10, the value of $1 + k_{max}$ depends only on the size of the data set to be transformed. It is known to those of ordinary skill in the art that $1+k_{max}=N/2$, where N is equal to the number of traces in the data set.

9. Determine the operator coefficient. Values of $\omega$ between 0 and $2\pi f_o$ are chosen, with the values selected so as to span the bandwidth occupied by the vibrator sweep signal. The term, $f_o$, is the Nyquist frequency determined by the sampling time interval of the traces.

The operator coefficients are computed from the complex conjugate computed in step 7 for the selected values of $\omega$. The location in the k-$\omega$ grid to which the computed coefficients are to be assigned are determined by computing, from Equation 11, the values of k corresponding to the selected values of $\omega$ for the selected dip.

10. Repeat steps 3 through 9 for each dip value calculated in step 2.
11. For operator coefficients not calculated, but which are needed to complete the field, interpolate from the calculated operator coefficients.

Applying the operator to the seismic data

The process of applying the operator to a seismic data section is as follows:

Let $S_{bc}(x,t)$ represent the seismic data in the normal time-distance form.

1. Transform the data into the k-$\omega$ domain:

$$S_{bc}(k,\omega) = \int_{-\infty}^{\infty} \int_{-\infty}^{\infty} S_{bc}(x,t)e^{-j(kx+\omega t)}dxdt$$

2. Convolve the phase correcting filter with the seismic data by multiplying the data value by the operator value at each data point on the k-$\omega$ grid.

$$S_{ac}(k,\omega) = F(k,\omega) \otimes S_{bc}(k,\omega)$$

3. Convert the data back to the time domain:

$$S_{ac}(x,t) = \int_{-\infty}^{\infty} \int_{-\infty}^{\infty} S_{ac}(k,\omega)e^{j(kx+\omega t)}dkd\omega$$

Alternatively, the derived filter may be transformed to the time-space domain, and then convolved with the seismic data in the time space domain as follows:

$$1. f(x,t) = \int_{-\infty}^{\infty} \int_{-\infty}^{\infty} F(k,\omega)e^{j(kx+\omega t)}dkd\omega$$

2. Let $s_{bc}(x,t)$ represent the seismic data before the phase correction, then perform a two-dimensional (2-D) convolution to perform the phase correction on the seismic data $$s_{ac}(x,t) = \int_{-\infty}^{\infty} \int_{-\infty}^{\infty} s_{bc}(x',t')f(x-x',t-t')dx'dt'$$

Regardless of whether the phase correcting filter is changed to the time-space domain or the data are changed to the frequency-wave number domain in order to perform the data correction, the processes are equivalent.

As indicated by Equation 5, in a constant source-receiver offset section, the Doppler factor is a function only of boat speed, $V_b$, and reflection event time dip, $\Delta t/\Delta y$. The Doppler effect does not depend explicitly on the amount of the offset or on the seismic velocity. Only one two-dimensional (2D) k-$\omega$ phase correcting operator per sweep type and boat speed is needed to correct a constant source-receiver offset section. For different offsets within the same data section, however, the same events will receive different phase treatments, so that for an exact correlation of phase distortion, a data set is processed before stacking, and prior to any other processing steps which alter the dip of reflection events.

If the time dip of an event changes only slightly as a function of offset, then the Doppler phase dispersion may be corrected approximately by applying the k-$\omega$ phase operator to data which have been corrected for normal moveout and stacked. Only reflections from shallow events at far offsets will not be substantially corrected, and those portions of a marine data set are normally muted out. Surveys that have particularly shallow target horizons or that will be processed to extract amplitude-versus-offset information may preferably be corrected for phase dispersion prior to stacking.

Before the phase correction is applied to a data set, dipping reflections should be examined to determine if any of them are spatially aliased. Spatially aliased means that the data are sampled too coarsely in the offset (i.e., space) direction. Higher frequencies in spatially aliased events appear, because of the sampling, to have dips different from their true dips. Such events will not receive a proper phase correction because they will not map into the expected location in the k-$\omega$ domain. An aliasing problem may be remedied either by interpolating the data set to a finer trace spacing, or by applying a low-pass filter to the data set at some stage in processing.

Figure 7:
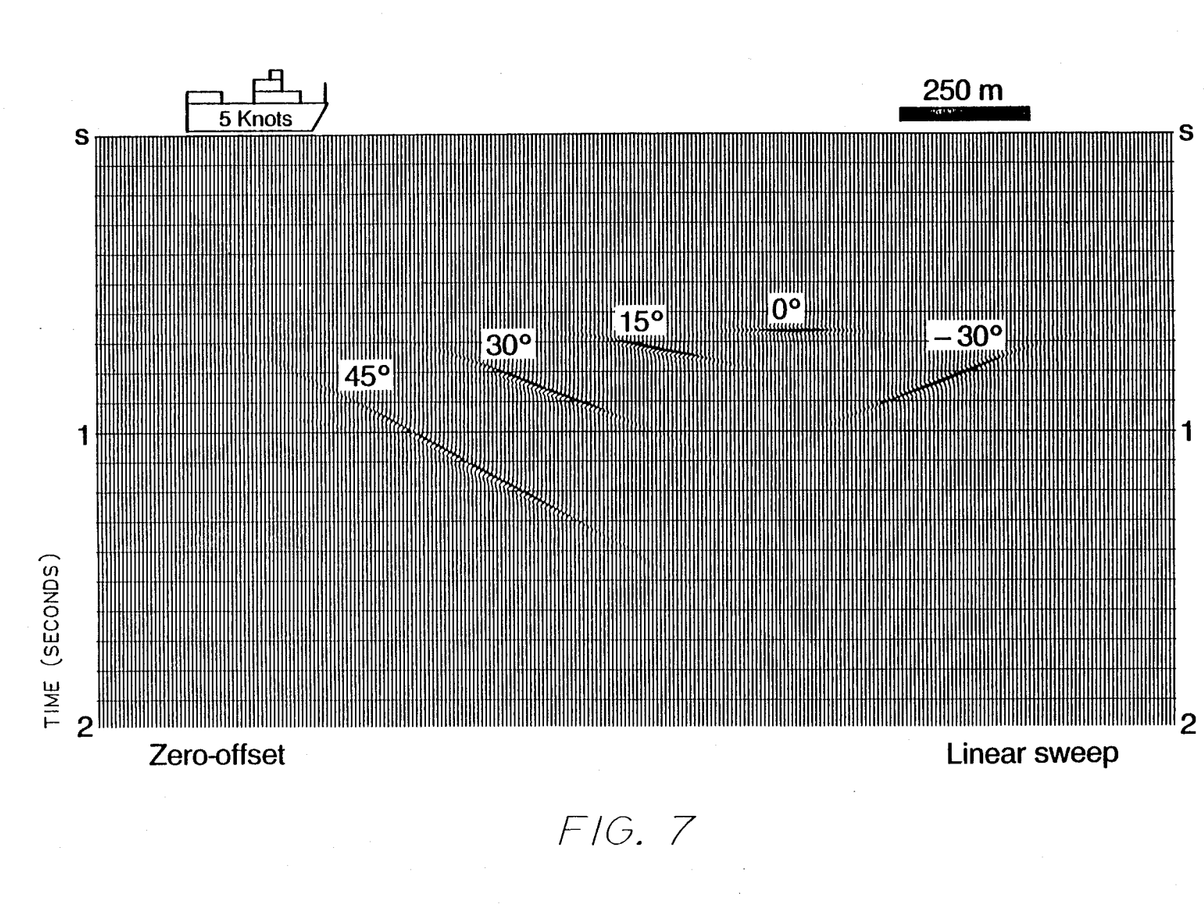
FIG. 7 is a model of a phase corrected version of the seismic data shown in FIG. 4.

FIG. 7 is a phase-corrected version of FIG. 4. A comparison shows that application of the phase-correction operator has removed the phase dispersion caused by the Doppler effect. It has also been verified that the same operator works equally well when applied to a non-zero-offset section as to a zero offset section.

Figure 8:
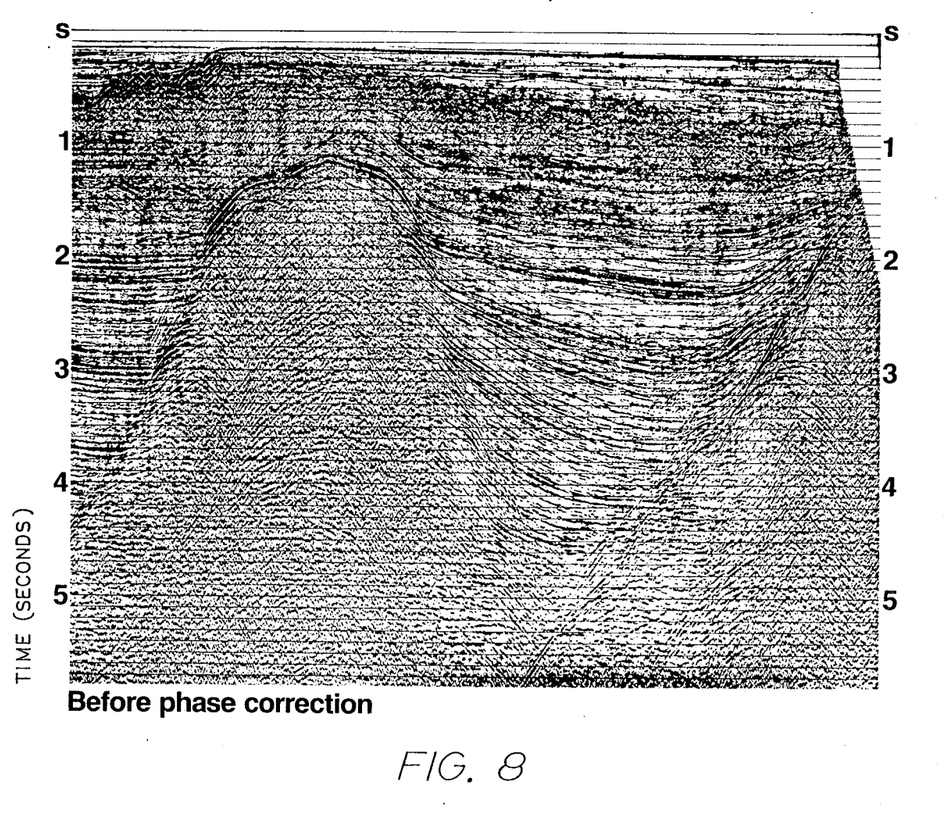
FIG. 8 shows marine seismic vibrator data before correction for phase dispersion.
Figure 9:
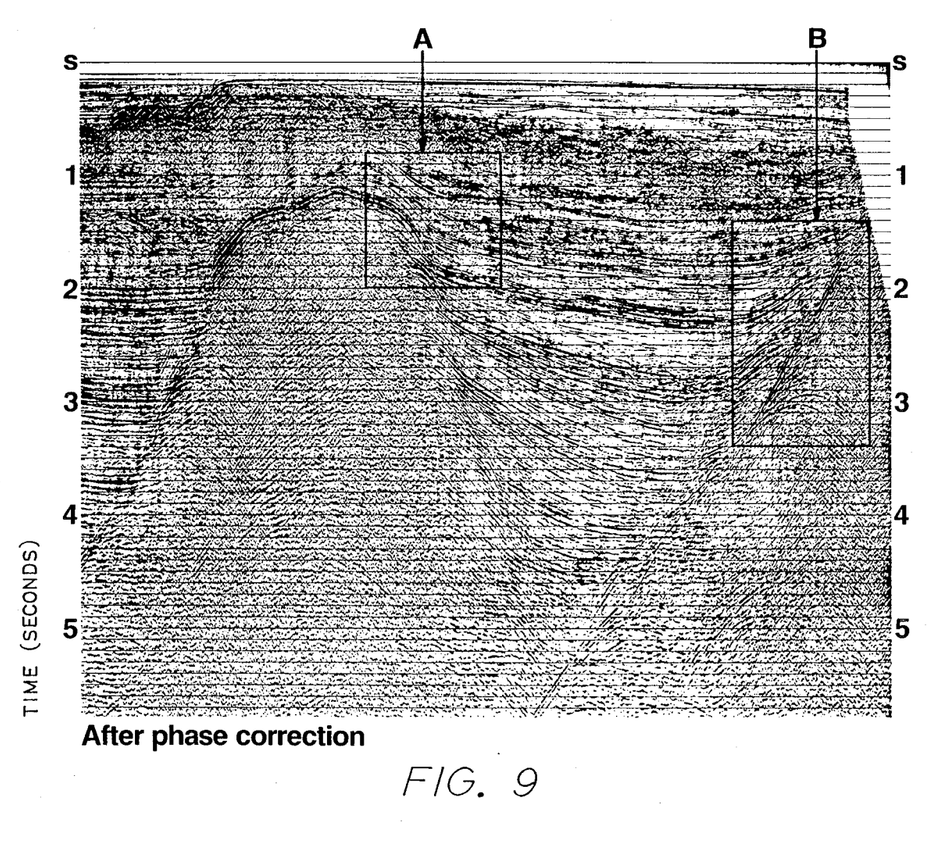
FIG. 9 shows the seismic data of FIG. 8 after correction for phase dispersion.

Several test lines have been recorded in the Gulf of Mexico using a vibratory source of the type discussed in the paper "Spectral Shaping With A Digital Marine Vibratory Source" presented at the 7th Annual International Meeting, Society of Exploration Geophysicists, in New Orleans, 1987. FIG. 8 shows a stack before application of the Doppler phase correction, and FIG. 9 shows the stack after application of the correction, for one of those lines, from the South Pass area offshore Louisiana. The line was shot with a 10 second sweep, going from 7.5 Hz to 100 Hz with a 6dB/octave slope before correlation. The boat speed was 4.7 knots (2.42m/sec) from left to right in the two figures.

The data processing, which was done at a 4-millisecond sampling interval, including trace-by-trace spiking deconvolution and dip-moveout before stack, and time-variant spectral whitening, automatic gain compensation, and time-variant bandpass filtering after stack.

FIGS. 8 and 9 show that the Doppler effect has caused an upward phase dispersion in dipping reflection events for which the boat motion was up-dip, and a downward phase dispersion in dipping events for which the boat motion was down-dip. The dispersion is most noticeable in the steep events at medium depths, such as those at the right-hand flank of the salt dome and at the right hand edge of the section. At depth the two sections are not much different because the higher frequencies, which suffer the greatest phase dispersion, are not present there.

Figure 10:
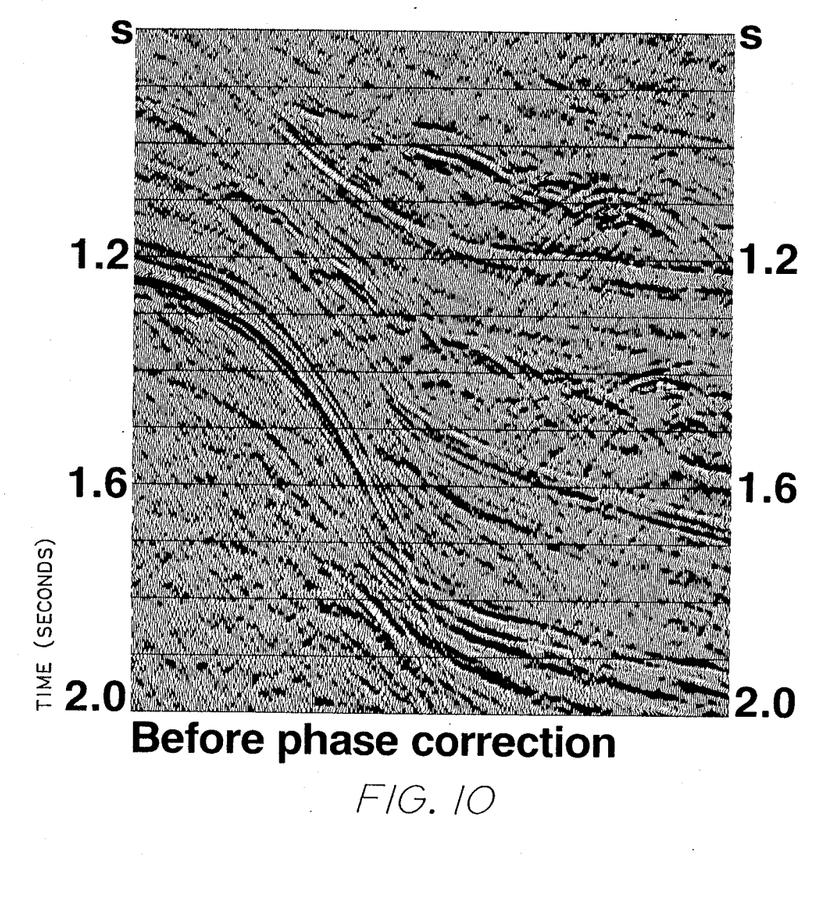
FIG. 10 shows a detail of the data of FIG. 8 before correction for phase dispersion.
Figure 11:
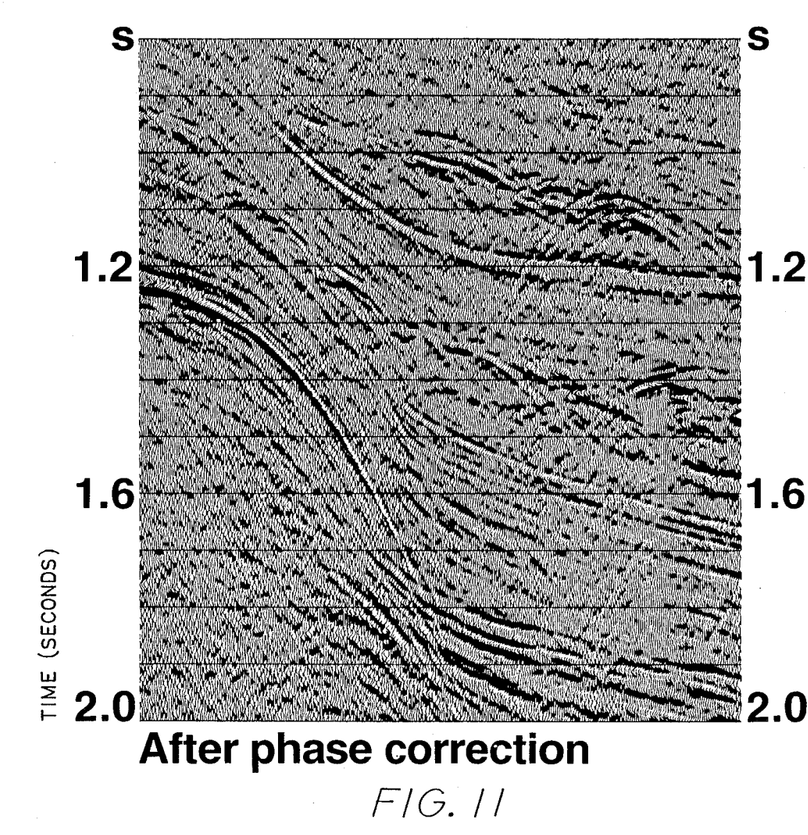
FIG. 11 shows the data of FIG. 10 after correction for phase dispersion.
Figure 12:
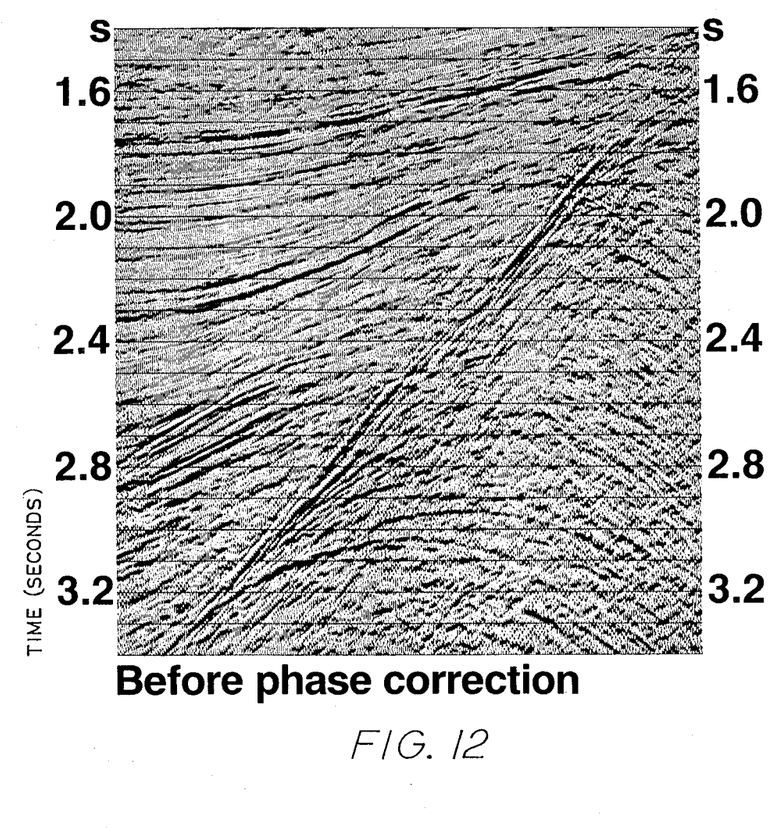
FIG. 12 shows another detail of the data of FIG. 8 before correction for phase dispersion.
Figure 13:
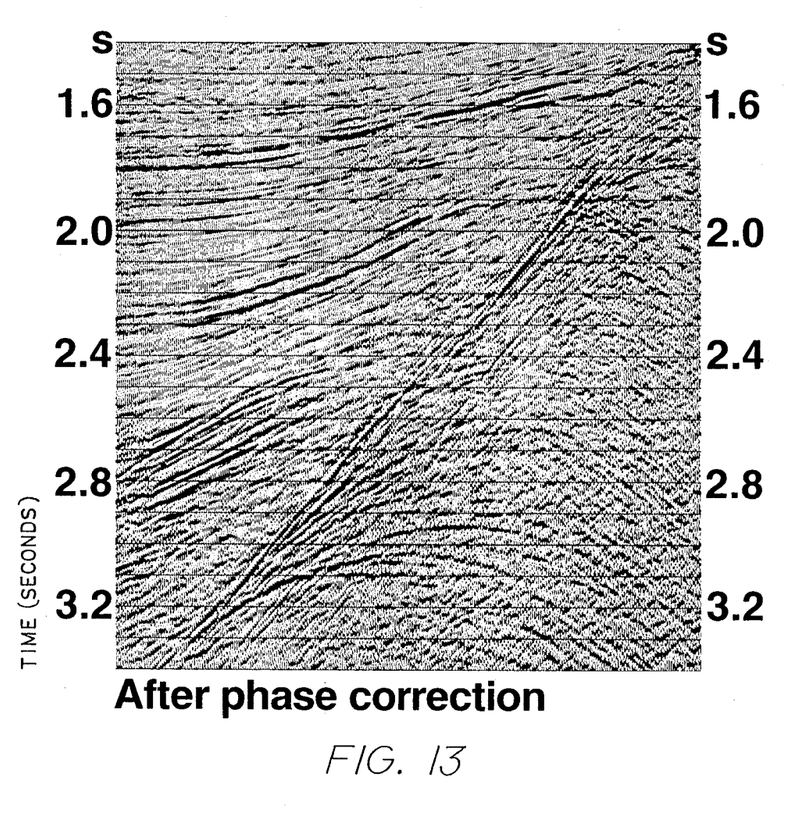
FIG. 13 shows the data of FIG. 12 after correction for phase dispersion.

FIGS. 10, 11, 12 and 13 show details of two regions from the middle part of the data shown in FIGS. 8 and 9. Here, the Doppler phase dispersion is more conspicuous. FIGS. 10 and 11 shown an enlargement of the data indicated by the letter A in FIG. 9. FIGS. 12 and 13 shown an enlargement of the data indicated by the letter B in FIG. 9. At 1.5 seconds, the diffraction from the top right-hand edge of the salt dome appears in the uncorrected data (FIG. 10) as a sequence of several parallel events. After the phase correction (FIG. 11), the diffraction appears as a single event. The steepest event, seen in FIGS. 12 and 13, has the most severe phase dispersion. Compared with the phase-corrected event in FIG. 13, the uncorrected event in FIG. 12 appears as several short-period multiples. The Doppler phase correction removes the dispersion and compresses the event into a much sharper, better-focused feature.

Figure 14:
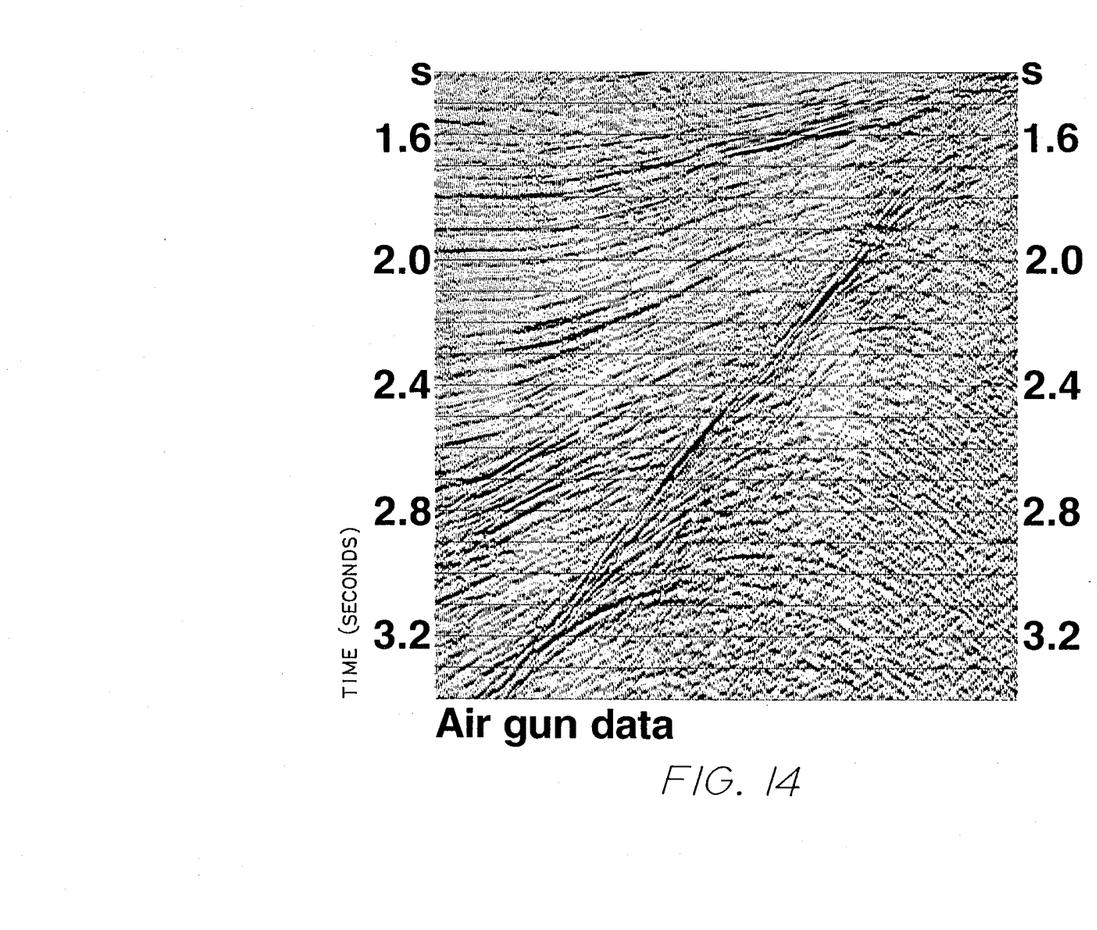
FIG. 14 shows air gun data for the same subsurface region as shown by the vibrator data in FIG. 12.

FIG. 14 shows a close-up view of a version of the same region shown in FIGS. 12 and 13 shot by an air gun crew. The steeply dipping event in FIG. 14 is not dispersed. The comparison shows that the phase corrected vibrator version of the event resembles the air gun version much better than does the uncorrected version.

The preferred embodiment of the invention has been described herein for the situation in which the seismic source and receivers are towed through a body of water by a seismic vessel. For seismic operations in which only the source is moving or in which only the detectors are moving, the same phase distortion will be present in the seismic data, and the same process described hereinabove may be utilized to reduce the distortion. It should be noted that for situations where the seismic sources and receivers are not both either stationary or moving at the same velocity, Doppler phase dispersion will also be present in seismic signals reflected from subsurface interfaces having 0° slope.

For the situation where the source is moving and the seismic receivers are stationary, the recorded seismic signals should be organized as common receiver gathers before applying the phase correcting operator. For the situation where the seismic source is stationary and the receivers are moving, the recorded seismic signals should be organized into common shot point gathers before applying the phase correcting operator. In both these situations, the distortion correction should be performed before stacking the data.

For illustrative purposes, the invention has been described with a certain degree of specificity. Variations will occur to those skilled in the art but which may be included within the scope of this invention which is limited only by the appended claims.

I claim as my invention:

1. A method of marine seismic exploration comprising:

towing a vibratory seismic source and a detector cable having seismic signal detectors mounted thereon through a body of water at a substantially constant speed;
emitting repeatedly a swept frequency seismic signal with said vibratory seismic source;
detecting said swept frequency seismic signals with said seismic detectors;
recording said detected seismic signals; and
convolving a phase correcting operator developed for said swept frequency signal and said speed with said recorded seismic signals to reduce distortion in said detected seismic signals resulting from reflections of said swept frequency signals from dipping subsurface reflecting interfaces of varying dip angles.

2. The method of claim further comprising:
determining the operator in the frequency-wave number domain;
transforming said recorded seismic signals to the frequency-wave number domain; and
wherein said operator is convolved with said recorded seismic signals in the frequency-wave number domain.

3. A method of reducing distortion in seismic signals generated by repeatedly transmitting a selected swept-frequency seismic signal with a vibratory seismic source and detecting said transmitted signal with seismic detectors while said source or said detectors, or both said source and said detectors, are towed through a body of water by a boat at a selected speed, said distortion resulting from a change in transmission path length from the source to a subsurface reflecting interface and back to the detectors during the signal transmission, comprising:

developing a phase correcting operator for the selected swept-frequency signal and the selected speed; and
convolving the phase correcting operator with the recorded seismic signals.

4. The method of claim 3 wherein the phase correcting operator is developed in the frequency-wave number domain and the recorded seismic signals are transformed to the frequency-wave number domain for convolving the recorded seismic signals with the phase correcting operator.

5. The method of claim 3 wherein the phase correcting operator is developed in the frequency-wave number domain and transformed to the time-space domain for convolving the recorded seismic signals with the phase correcting operator.

6. A method of reducing distortion in seismic signals generated by repeatedly transmitting a selected swept-frequency seismic signal with a vibratory seismic source and detecting said transmitted signal with seismic detectors while said source or said detectors, or both said source and said detectors, are towed through a body of water by a boat at a selected speed, said distortion resulting from a change in transmission path length from the source to a subsurface reflecting interface and back to the detectors during the signal transmission, comprising:

developing a phase correcting operator by computing for a plurality of selected time dips the distorted forms of the transmitted swept-frequency signal resulting from the selected time dips;
correlating each distorted swept-frequency signal with the transmitted swept-frequency signal to generate a plurality of correlated wavelets;
converting the correlated wavelets to the frequency domain;
generating the complex conjugate of the correlated wavelets in the frequency domain;
determining, for each selected dip value, corresponding values of wave number, k, and frequency, $\omega$:

calculating phase correcting operator coefficients in the frequency-wave number domain for corresponding values of k and $\omega$; and convolving the phase correcting operator with the detected seismic signals.

7. The method of claim 6 further comprising:

transforming the phase correcting operator to the time-distance domain prior to convolving the phase correcting operator with the detected seismic signals.

8. The method of claim 6 further comprising:

transforming the detected seismic signals to the frequency-wave number domain;

convolving the phase correcting operator with the transformed seismic signals by multiplying data values of the transformed seismic signals with the phase correcting operator coefficients for corresponding locations in a frequency-wave number grid; and transforming the convolved seismic signal back to the time-distance domain.

9. A method of reducing distortion in seismic signals generated by repeatedly transmitting a selected swept-frequency seismic signal with a vibratory seismic source and detecting said transmitted signal with seismic detectors while said source or said detectors, or both said source and said detectors, are towed through a body of water by a boat at a selected speed, said distortion resulting from a change in transmission path length from the source to a subsurface reflecting interface and back to the detectors during the signal transmission, comprising:

convolving with the recorded seismic signals a phase correcting operator developed from the following procedure implemented on a digital computer, (a) initializing $F(k,\omega)$ as an all pass filter, $F(k,\omega) = 1 + 0j$, for all k and $\omega$, in which $j = \sqrt{-1}$;

(b) starting a dip loop;

$$\text{dip}_i = (i-1)\frac{\text{dip}_{max}}{N}, \text{ for } i = 1 \text{ to } N$$

where

N = a selected number of dips and $\text{dip}_{max}$ = steepest dip in the seismic data, in seconds/trace;

(c) computing th Doppler factor for a first selected dip, $\text{dip}_i$ $$\delta_i = \frac{-(V_b)\text{dip}_i}{\Delta y}$$

where $\delta$ = Doppler factor $V_b$ = velocity of the boat $\Delta y$ = spacing between seismic data traces, meters/trace (d) calculating a distorted sweep for the first selected dip by replacing t with t $(1+\delta_i)$ in the equation defining the selected signal, $$v_s(t) = v(t(1+\delta_i))$$

where $v_s(t)$ = distorted sweep $v(t)$ = transmitted sweep;

(e) correlating the distorted sweep with the transmitted sweep for the first selected dip to generate a correlated wavelet, W(t)

$$W(t) = v_s(t) \circledast v(t)$$

where $\circledast$ represents the correlation function;

(f) converting the correlated wavelet to the frequency domain $$W(\omega) = \int_{-\infty}^{\infty} W(t)e^{-j\omega t}dt;$$

(g) computing the complex conjugate $W^*(\omega)$ for $W(\omega)$, where * indicates complex conjugate;

(h) calculating, for the selected dip, the values of wave number, k, as a function of frequency, $\omega$:

$$k = 1 + 2(\text{dip}_i)(\omega)\frac{(k_{max})}{2\pi}$$

where $k_{max} = N/2 - 1$ and

N = number of seismic data traces utilized;

(i) calculating the operator coefficients;

(j) repeating steps (c)–(i) for each selected dip;

(k) interpolating from the calculated operator coefficients any additional coefficients needed to complete a desired field, to generate said phase correcting operator.

10. The method of claim 9 further comprising:

transforming the recorded seismic signals from the time-distance domain to the frequency-wave number domain;

convolving the phase correcting operator with the transformed seismic signals in the frequency-wave number domain; and converting the convolved seismic signals back to the time-distance domain.

11. The method of claim 9 further comprising:

transforming the phase correcting operator from the frequency-wave number domain to the time-distance domain, wherein said recorded seismic signals are convolved with the phase correcting operator in the time-distance domain.

12. A method of reducing distortion in seismic signals generated by repeatedly transmitting a selected swept-frequency seismic signal with a vibratory seismic source and detecting said transmitted signal with seismic detectors while said source or said detectors, or both said source and said detectors, are towed through a body of water by a boat at a selected speed, said distortion resulting from a change in transmission path length from the source to a subsurface reflecting interface and back to the detectors during the signal transmission, comprising:

determining a phase correcting operator from the following procedure implemented on a digital computer:

(a) initializing $F(k,\omega)$ as an all pass filter, $F(k,\omega) = 1 + 0j$, for all k and $\omega$, in which $j = \sqrt{-1}$;

(b) starting a dip loop;

$$\text{dip}_i = (i-1)\frac{\text{Dip}_{max}}{N}, \text{ for } i = 1 \text{ to } N$$

where

N = a selected number of dips; and
$dip_{max}$ = steepest dip in the seismic data, in seconds/trace;

(c) computing the Doppler factor for a first selected dip, $dip_i$ $$\delta_i = \frac{-(V_b)dip_i}{\Delta y}$$

where
$\delta$ = Doppler factor
$V_b$ = velocity of the boat
$\Delta y$ = spacing between seismic data traces, meters/trace;

(d) calculating a distorted sweep for the first selected dip by replacing t with $t(1+\delta_i)$ in the equation defining the selected signal, $$v_s(t) = v(t(1+\delta_i))$$

where
$v_s(t)$ = distorted sweep
$v(t)$ = transmitted sweep;

(e) correlating the distorted sweep with the transmitted sweep for the first selected dip to generate a correlated wavelet, W(t)

$$W(t) = v_s(t) \; v(t)$$

where represents the correlation function;

(f) converting the correlated wavelet to the frequency domain $$W(\omega) = \int_{-\infty}^{\infty} W(t)e^{-j\omega t}dt;$$

(g) computing the complex conjugate $W^*(\omega)$ for $W(\omega)$, where * indicates complex conjugate;

(h) calculating, for the selected dip, the values of wave number, k, as a function of frequency, $\omega$:

$$k = 1 + 2(dip_i)(\omega)\frac{(k_{max})}{2\pi}$$

where
$k_{max} = N/2 - 1$ and
N = number of seismic data traces utilized;

(i) calculating the operator coefficients;
(j) repeating steps (c)–(i) for each selected dip;
(k) interpolating from the calculated operator coefficients any additional coefficients needed to complete a desired field, to generate said phase correcting operator;

transforming the recorded seismic signals from the time-distance domain to the frequency-wave number domain;

convolving the phase correcting operator with the transformed seismic signals in the frequency-wave number domain; and converting the convolved seismic signals back to the time-distance domain.

* * * * *